United States Patent

Knudsen

[11] 4,044,941
[45] Aug. 30, 1977

[54] CONTAINER CLOSED BY A MEMBRANE TYPE SEAL

[76] Inventor: David S. Knudsen, 3145 Hawthorne Blvd., St. Louis, Mo. 63104

[21] Appl. No.: 675,798

[22] Filed: Apr. 12, 1976

[51] Int. Cl.² .................. B65D 5/64; B65D 53/00
[52] U.S. Cl. .................. 229/43; 215/DIG. 1; 220/306; 220/359; 215/341; 215/232
[58] Field of Search .......... 229/43; 215/DIG. 1, 215/341, 232; 220/306, 359

[56] References Cited

U.S. PATENT DOCUMENTS

| 3,428,208 | 2/1969 | Kosar | 215/DIG. 1 |
| 3,892,351 | 7/1975 | Johnson et al. | 229/43 |

Primary Examiner—William Price
Assistant Examiner—Douglas B. Farrow
Attorney, Agent, or Firm—Gravely, Lieder & Woodruff

[57] ABSTRACT

The open top of a container is surrounded by a rim having a curved upwardly presented surface and a slight ridge projecting upwardly from the curved surface. A seal membrane containing a metal foil extends over the open top of the container and seats against the ridge on the container rim. A flexible lid fits over the membrane and interlocks with the rim so that the membrane is interposed between the ridge and the lid. The lid has a downwardly opening annular groove which receives the container rim and this causes the seal to wrap generally around the curved upper surface of the rim. Once the lid and membrane are in place, the membrane is induction heated above the melting point of the container material, while a downwardly directed force is applied to the lid. The ridge, which is in contact with the seal membrane, melts down and thereafter is allowed to cool while the force is maintained on it, so that when the material solidifies, it is bonded to the membrane.

15 Claims, 5 Drawing Figures

CONTAINER CLOSED BY A MEMBRANE TYPE SEAL

BACKGROUND OF THE INVENTION

This invention relates in general to containers, and more particularly to containers which are closed by membrane-type seals and a process for applying such seals.

Many food containers are closed by a lid which may be removed and replaced with relative ease, and to insure that the container is completely sealed beneath the lid, it is not uncommon to interpose a disk-like seal element between the lid and the top rim of the container. This seal element conforms to irregularities in the upper rim of the container so that the container is sealed even though its lid does not fit tightly against the upper surface of the rim. Seal elements of this nature are used quite often in connection with screw caps, and are retained in place usually by nothing more than the closure force exerted by the screw cap. Sometimes the disk-like seal elements contain a layer of aluminum foil.

Plastic containers capped with snap-type plastic lids are now used quite extensively in the food industry, particularly for spreads such as margerines. Both the container and lid are quite flexible, but when the lid is in place, the upper end of the container is confined and not easily distorted. The snap lids cannot be run down and secured with the firmness of a screw cap, and it is therefore difficult to adequately compress a disk-like seal with such a lid. Moreover, heat sealing foil membranes to the top rims of such containers has not been practical since the containers will distort significantly under the force of a heated platen. Of course, the lid will hold the container in the proper shape, but the lid cannot be in place when a weld is made with a heated platen.

U.S. patent application Ser. No. 672,719, of David S. Knudsen filed Apr. 1, 1976, and entitled MACHINE AND PROCESS FOR CAPPING AND SEALING CONTAINERS, discloses a machine for heat sealing foil membranes to the top rims of highly flexible containers while the lids of the containers are in place, thus enabling the lids to rigidify and maintain the containers in the proper place during the application of the force necessary to effect the heat seal. However, the foil membrane is not heated by conduction but is instead inductively heated in a strong magnetic field, the polarity of which constantly changes.

SUMMARY OF THE INVENTION

One of the principal objects of the present invention is to provide a container and lid therefor which are configured to effect a good heat seal between a foil membrane located between the lid and the top rim of the container. Another object is to provide a container and lid which are configured to provide maximum surface area contact between top rim of the container and the foil membrane which is interposed between the lid and top rim. A further object is to provide a container and lid that are easily and inexpensively manufactured. An additional object is to provide a container and lid therefor, with the latter being easily removed from and replaced on the former. Still another object is to provide the combination of a container, a lid, and a seal membrane, all of which are ideally suited for passage through the heat sealing machine of copending application Ser. No. 672,719, of David S. Knudsen filed Apr. 1, 1976, and entitled MACHINE AND PROCESS FOR CAPPING AND SEALING CONTAINERS. Yet another object is to provide a process for heat sealing a foil membrane to the rim surrounding the open top of a container. These and other objects and advantages will become apparent thereinafter.

The present invention is embodied in a combination including a container having an upwardly presented rim, a seal membrane extended over the top on the container and being sealed against the rim, and a lid extended over the seal membrane and having a downwardly opening groove which receives the container rim so that the membrane is caused to wrap over the upper surface of the rim. The invention is also embodied in a container having a rim provided with an upwardly projecting ridge against which the membrane is seated. The invention is further embodied in the process for attaching the membrane to the rim, that process involving induction heating the membrane while applying a downwardly directed force thereto so as to cause the ridge to melt down and thereafter allowing the melted material to cool while the force is maintained so that the membrane bonds to the seal. The invention also consists in the parts and in the arrangements and combinations of parts hereinafter described and claimed.

DESCRIPTION OF THE DRAWINGS

In the accompanying drawings which form part of the Specification and wherein like numerals and letters refer to like parts wherever they occur.

DETAILED DESCRIPTION

Figure 1:
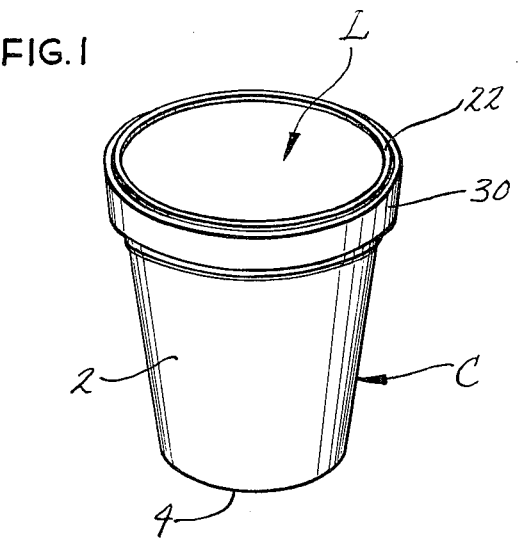
FIG. 1 is a perspective view of a container of the present invention with its lid applied.
Figure 4:
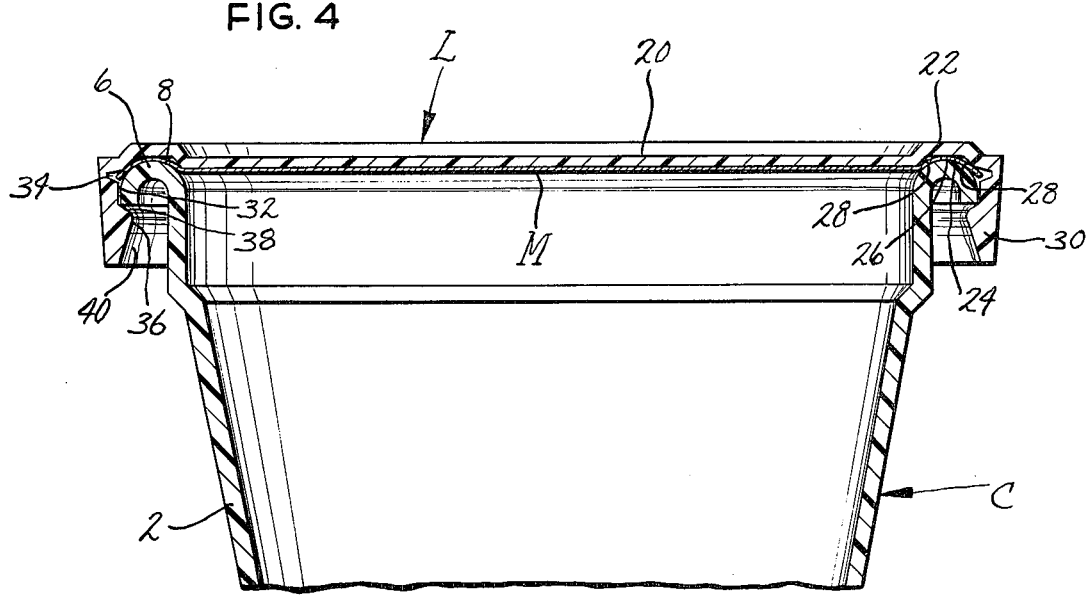
FIG. 4 is a sectional view showing the container with the seal membrane sealed to it and the lid in place.

Referring now to the drawings (FIG. 1) C designates a container over which a snap-type lid L fits. The container is particularly suited for food products, but may be used with other substances as well. The lid L is applied to the container C with a foil membrane M contained within it, and thereafter the foil membrane M is heat sealed to the container C so as to completely close the open top (FIG. 4). Hence, if the lid L is removed, which is a relatively simple procedure, the interior of the container C still remains sealed. The lid L interlocks with the upper end of the container C and rigidifies the upper end.

Figure 2:
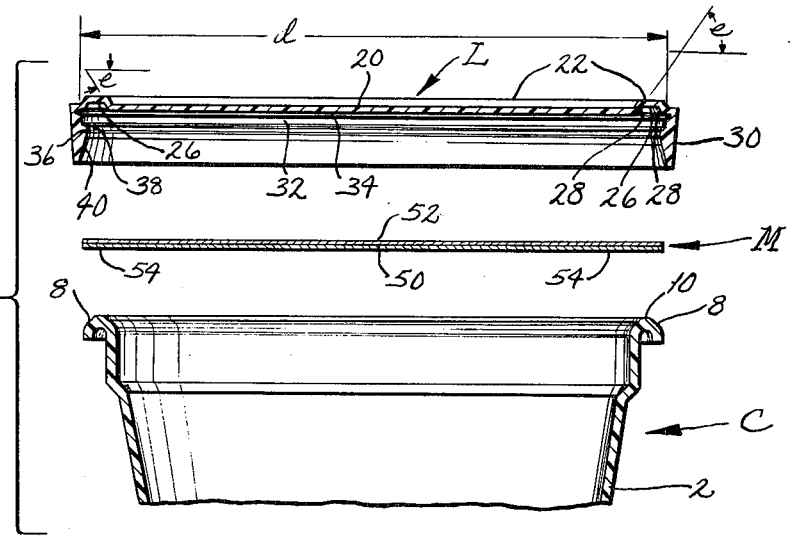
FIG. 2 is an exploded sectional view showing the container and also the seal membrane and the lid which are applied to the container.
Figure 3:
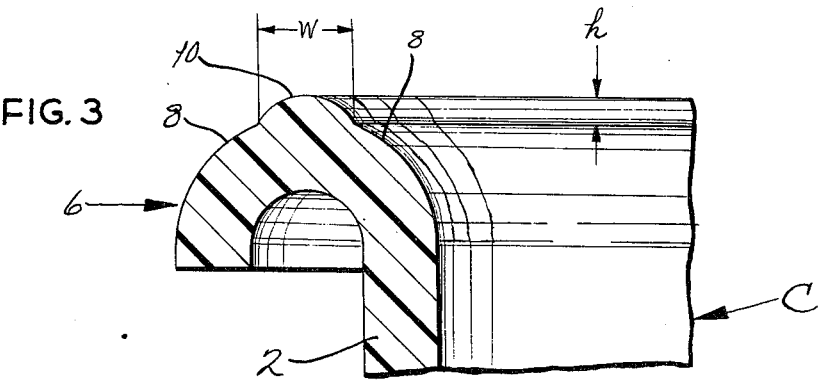
FIG. 3 is an enlarged fragmentary sectional view showing the container rim.

The container C is preferably molded from a flexible plastic material such as polyethylene. The container C has a circular side wall 2 which at its lower end merges into a bottom wall 4 that completely closes the lower end of the container C. The bottom wall 4 is formed integral with the side wall 2 and accordingly rigidifies the lower end of the side wall 2, so that the side wall 2 is not easily distorted at its lower end. The side wall 2 at its upper end is directed outwardly and then downwardly to form a top rim 6 possessing an inverted U-shaped configuration (FIG. 2). Thus, the rim 6 projects radially beyond the side wall 2. The rim 6 has a curved upwardly presented surface 8 (FIG. 3) which is generally arcuate in cross section. In other words, the surface 8 is convex. Prior to the heat sealing of the membrane M, the rim 6 along the uppermost portion of its top surface 8 is provided with a slight embossment or ridge 10 which is also curved or arcuate, but the radius of curvature for the ridge 10 is substantially less than that of upper surface 8 for the rim 6. In particular the radius of curvature for the upper surface 8 should be 2 to 10 times greater than that of the ridge 10. The ridge 10 is continuous and extends completely around the rim 6. Its height $h$, that is its rise above the upper surface 8, should be between 0.003 to 0.060 inch and preferably should be about 0.015 inch. At the juncture with the curved surface 8, the width $w$ of the ridge 10 should be between 0.015 and 0.100 inch and preferably 0.050 inch. In the absence of the lid L, the rim 6 and side wall 2 are with little effort distorted into an elliptical shape.

The lid L is circular and is preferably molded from a flexible plastic such as polyethylene. It includes a flat cross portion 20 (FIG. 2) which near its periphery has a raised pressure pad 22 of annular configuration. The pad 22 extends around the entire lid L and is continuous. It has a planar top surface which is parallel to the cross portion 20 and beveled side face which merges into the cross portion 20. Directly beneath the pad 22 is an annular groove 24 which opens downwardly and its diameter and width are such that it will receive the rim 6 on the container C when the lid L is placed over the container C. The groove 24 is defined by a planar top surface 26 and beveled inner and outer surfaces 28. The plane of the top surface 26 is parallel to the cross portion 20, while the beveled surfaces may be oriented at an angle $e$ (FIG. 2) of between 10° and 90° with respect to the top surface. Preferably the angle $e$ is 45°. Moreover, the width of the groove 24 is such that when the rim 6 of the container C is received in it, the beveled surfaces 28 will be located opposite the curved upper surface 8 on the rim 6, while the ridge 10 will be opposite the planar surface 26. The ridge 10 initially maintains the lid L in an elevated condition in which the beveled surfaces 28 are spaced somewhat away from the curved upper surface 8 of the rim 6. However, should the ridge 10 be eliminated, the beveled surfaces 28 of the groove 24 will move closer to the curved upper surface 8 of the rim 6 (FIG. 4). The thickness of the lid L at the pad 22 is about the same as at flat cross portion 20.

The lid L further includes a downwardly projecting skirt on flange 30 (FIGS. 2 and 4) which is merged into the cross portion 20 at the periphery of the latter. The flange 30 has an inside cylindrical surface 32, the diameter of $d$ (FIG. 2) of which is slightly greater than the outermost or largest diameter of the rim 6 on the container C. When the lid L is on the container C, the surface 32 lies opposite the lower end of the rim 6. Between the cylindrical surface 32 and the outer of the two beveled surfaces 28 is a radial groove 34 which opens inwardly generally in alignment with the underside of the flat cross portion 20. The diameter of the groove 34 at its base is slightly greater than the diameter of the foil membrane M.

The flange 30 is further provided with an inwardly directed lip 36 (FIGS. 2 and 4) having beveled upper and lower surfaces 38 and 40 with the former being located at a much greater angle to the vertical than the latter. The inner diameter of the lip 36 is less than the other diameter of the container rim 6, but is greater than the diameter of the container side wall 6 at the rim 6. Hence, when the lid L is on the container C, the lip 36 will project inwardly beneath the container rim 6. The lower portion of the lip L is beveled outwardly so that the inside diameter of the flange 30 at the very bottom thereof is greater than the largest diameter of the rim 6 and also the largest diameter of the pressure pad 22. This facilitates installation of the lid L on the container C, since the lid need only be forced downwardly to spread on flange 30. This relationship of diameters further enables the lids L to be nested, that is stacked one against another with the pressure pad 22 of one lid L being received within the flange 30 of the succeeding lid L.

The seal membrane M is actually a laminate composed of a thin metal foil 50 (FIG. 2) and an insulating layer 52 which are bonded together. The foil may be aluminum having a thickness of between 0.0005 and 0.030 inch, while the insulating layer should be at least 0.005 inch thick. The insulating layer should be able to withstand temperatures slightly in excess of the melting temperature for the material from which the container C is formed and in the case of polyethylene that temperature is about 350° F. The foil layer 50 is provided on its opposite face with a coating 54 of the same material as that from which the container C is made, which in most cases is polyethylene. That coating exists at least near the periphery of the foil layer 50. The seal membrane M fits within the lid with insulating layer 52 being presented toward the cross portion 20. Thus, the foil layer 50 is presented downwardly and its coating will bear against the container rim 6 when the lid L is installed on the container C. The diameter of the membrane M is slightly greater than the diameter of the cylindrical surface 32 on the flange 30 so that once the membrane M has past the surface 32, it will expand outwardly into the radial groove 34. Thus, the radial groove 34 retains the membrane M within the lid L.

The stiffness of the membrane M may be increased by embossing a quilted configuration into the foil layer 50. This increase in stiffness enhances the retention of the membrane M in the lid L prior to the application of the lid L to the container C. For extremely large diameter lids L, the membrane M may be glued to the cross portion 20.

The lid L is applied to the container C merely by forcing it over the rim 6. More specifically, the lid L is placed loosely over the rim 6 of the container, and then a downwardly directed force is applied to the lid L along the annular pressure pad 22 thereon. This force causes the inclined lower surface 40 on the lip 36 of the flange 30 to ride over the rim 6 and expand the flange 30. The flange moves over the rim 6 until the lid L bottoms out against the ridge 10 on the container rim 6. At this point the inwardly directed lip 36 on the flange 30 is past the lower end of the rim 6 so that the flange 30 contracts and resumes its normal shape. When the lid L is so disposed, the beveled surface 38 on the lip 36 is located immediately below the end of the outwardly turned rim 6 on the container C, thus securing the lid L to the container C. In this condition, the seal membrane M is interposed between the rim 6 on the container C and the pressure pad 22 on the lid L. Moreover, the membrane M is deformed over the curved surface 8 as well as the ridge 10 and generally follows the contour of those portions. In other words, the membrane M tends to wrap around the curved upper surface 8 of the container rim 6. A machine for applying the lid L is illustrated in U.S. Pat. No. 3,332,209.

Once the lid L is in place, a heavy force is applied to the lid L at the pad 22 thereon. This compresses the seal membrane M slightly against the ridge 10 so as to exclude any foreign particles from the interface between the two. Then the container C is passed through strong magnetic field which rapidly undergoes changes in polarity. The alternating field induces eddy current losses in the metal foil layer 50 of the seal membrane M, causing the foil layer 50 to experience a rise in temperature. Due to the nominal thickness of the foil layer 50, the raise in temperature is quite rapid, and indeed almost instantaneous. The magnetic field is of sufficient intensity to raise the temperature of the foil layer 52 above the melting point of the material from which the container C is molded. In the case of polyethylene the melting temperature is about 350° F and the foil layer 50 of the membrane M should be elevated to between 400° and 500° F.

The heat developed in the foil layer 50 of the membrane M is conducted to the coating 54 and the ridge 10 of the container rim 6, since the ridge 10 is against the foil layer 50. As a result the ridge 10 softens and becomes very plastic. The heat is also conducted to the curved surface 8 of the rim 6, where the foil layer 50 and curved surface 8 are in contact. The insulating layer 52 separates the heated foil layer 50 from the lid L from melting. While the elevated temperature is maintained, a downwardly directed force is applied to raised pressure pad 22 on the lid L, and this force is transmitted through the pad 22 and the underlying membrane M to the ridge 10 on the container rim 6. Being in a plastic condition, the ridge 10 deforms easily in the presence of the force and spreads laterally beneath the metal foil 50 of the membrane M. Indeed, the ridge 10 is for all practical purposes obliterated so that the membrane M is compressed between the curved upper surface 8 of the rim 6 and the planar top surface 26 of the downwardly opening groove 24 (FIG. 4). The resin material which formally composed the ridge 10 bonds to the coating 54, and inasmuch as the mmaterial has been melted or at least rendered highly plastic, the material follows the contours of the membrane M and fills any irregularities. Thus, an air-tight seal is formed directly beneath the planar top surface 26 of the lid groove 24.

Not only is the membrane forced against the rim 6 at its area underlying the planar surface 28, but it is also caused to curve downwardly and follow the general contour of the curved upper surface 8 on the rim 6. This deformation is caused by the beveled side surfaces 28 of the groove 24 which are located opposite the downwardly sloping portions of the curved surface 8 on the rim 6. As a result a substantial surface area on the foil 50 of the membrane M is brought against the soft plastic material which formerly constituted the ridge 10 on rim 6 of the container C. This provides an extremely secure air-tight seal over the top of the container C. The foil layer 50 is permitted to cool while the force is maintained, and this cooling occurs quite rapidly, again due to the nominal thickness of the layer 50. The force is maintained until the material of the rim 6 solidifies and becomes firm. At this point a strong bond exists between the coating 54 on the foil layer 50 and the rim 6, the bond being in the nature of a weld.

It is possible to obtain a bond of lesser strength so that the membrane becomes a so-called "peel seal," that is it is easily peeled off of the rim 4 by a manually exerted force. One way to obtain a peel seal is to reduce the size of the ridge 10 so that less plastic material is available to melt down and bond to the membrane M. Another way is to make the coating 54 on the membrane M a plastic material which is dissimilar to and somewhat incompatible with the material of the container C. The two dissimilar plastics fuse together, but create a somewhat weak bond. In either case, the ridge 10 melts down.

Figure 5:
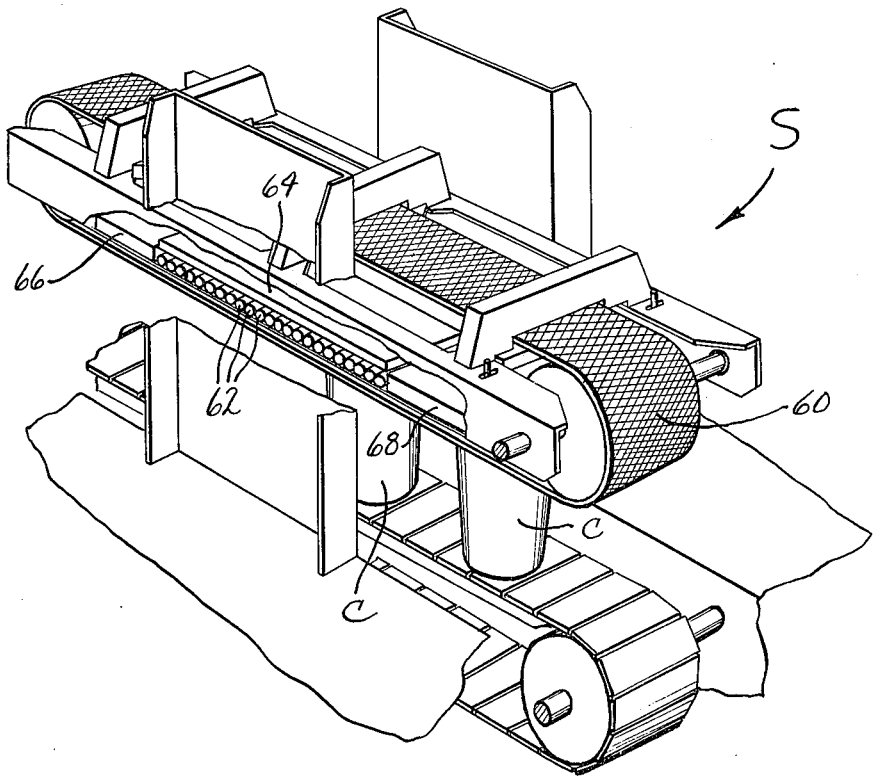
FIG. 5 is a perspective view showing apparatus for heat sealing the seal membrane to the container rim.

Preferably the force which is applied to the lid L while the metal foil 50 is induction heated is not constant, but instead is undulating or ripple-like in nature. This may be achieved by passing the container C with its lid L in place through a heat sealing machine S (FIG. 5) including an underlying conveyor chain 58 an an overhead conveyor belt 60. The spacing between the upper pass of the chain 58 and the lower pass of the belt 60 is slightly less than the height of the container C with the lid L on it. The conveyor belt 60 is made from a highly flexible material and a portion of its lower pass is backed by a plurality of rollers 62 which may be about ¼ inch in diameter and revolve about axes extended transversely of the direction in which the belt 60 travels. The rollers 62 are located as close together as possible and are formed from a nonmetalic material which is slightly resilient so that the roller will spring slightly when subjected to forces transmitted through the belt. Plastic having a high content of glass fibers is suitable for this material. Located immediately behind the rollers 62 is an electric coil 64 which when energized creates a magnetic field of sufficient intensity below the belt 60 to elevate the temperature of the membranes M above the melting temperature for the container C. Ahead of the rollers 62, the lower pass of the belt 60 is backed by a flat skid plate 66 and likewise beyond the rollers the lower pass is backed by another flat skid plate 68. Thus, as a container C on the conveyor chain 58 approaches the region of the magnetic field, the lid L is forced tightly downwardly and the membrane M is compressed between the lid L and the rim 6. This initial force excludes any foreign particles from the interface between the ridge 10 and curved surface 8 of the container rim 6 and the opposing surface area on the foil layer 50 of the membrane M. Thereafter, the downwardly directed force is exerted by the rollers 62. Since the belt 60 is quite flexible, it tends to follow the contour of the rollers 60 and as a result the downwardly directed force is exerted along a series of lines spaced about ¼ inch apart, each line of course repesenting a different roller 62. Moreover, each line tends to wipe across the lid L from the front to the rear thereof inasmuch as the container C and lid L are moved underneath the rollers 62. The end result is ripple-like or undulating force applied to the lid L as the foil layer 50 of the membrane M is heated. Once the container C leaves the vicinity of the magnetic field, the downwardly directed force is applied by the skid plate 68. At this point irregularities in the rim 6 of the container C have been reduced due to the melt down of the ridge 10. Beneath the plate 68, the membrane M cools quite rapidly, due to the nominal thickness, and as it cools the material of the former ridge 10 on the rim 6 solidifies and bonds firmly to the membrane M. The force remains for as long as the container C is beneath the flat skid plate 68, and the container C remains under the plate 68 long enough for the material of the former ridge 10 to cool and solidify.

The heat sealing machine S is more completely described in copending application Ser. No. 672,719, of David S. Knudsen filed Apr. 1, 1976, and entitled MACHINE AND PROCESS FOR CAPPING AND SEALING CONTAINERS.

While it is important from the standpoint of inductive heating to have the foil layer 50 present in the membrane M, it is not absolutely essential to have the insulating layer 52 or the coating 54.

Containers formed from other types of materials such as glass and metal may likewise be provided with a rim 6 having a curved upper surface 8 and a ridge 10 projected upwardly from the surface 8. It has been found that membranes M having suitable adhesive coatings bond particularly well to the ridge 10 when the membrane M is applied with the heat sealing machine S, even though no melt down occurs when such materials are used.

This invention is intended to cover all changes and modifications of the example of the invention herein chosen for purposes of the disclosure which do not constitute departures from the spirit and scope of the invention.

What is claimed is:

1. The combination comprisng: a container having an upwardly presented opening and a rim surrounding the opening and being formed entirely from a nonmetallic material, the rim having a convex upwardly presented surface; a flexible seal membrane extended over the open top of container as well as over the convex upwardly presented surface of the rim, the membrane including a metal foil which is at least located in the area of the membrane overlying the rim of the container so that the membrane may be induction heated to a prescribed temperature by placing it in a magnetic field which undergoes rapid reversals in polarity; a nonmetallic sealing material interposed between the convex surface of the rim and the foil of the membrane, the sealing material being capable of becoming plastic when heated to the prescribed temperature, the sealing material being plastically deformed between and adhered to the foil and the rim at the convex surface as a result of the foil being induction heated to the prescribed temperature and forced toward the rim with plastic deformation being sufficient to effect a seal between the opposed surfaces of the membrane and rim; and a lid including a cross portion which overlies the membrane and the container rim and a downwardly projecting skirt at the periphery of the cross portion with the skirt fitting snugly around the rim, the cross portion having a preformed groove which aligns with and is directly above the rim with the groove being defined in part by continuous beveled side surfaces which downwardly diverge and are spaced sufficiently apart to enable the rim to be partially received in the groove when the skirt is around the rim, the side surfaces of the groove being arranged to confine the member such that it generally follows the contour of the convex upper surface of the rim for a substantial distance in the lateral direction.

2. The combination according to claim 1 wherein the nonmetallic sealing material is the same material as the nonmetalic material from which the container rim is formed.

3. The combination according to claim 2 wherein the sealing material prior to being deformed is in the form of a ridge formed integral with and projecting upwardly from the convex surface.

4. A combination according to claim 1 wherein the lid has an upwardly projecting pressure pad which is directly above the groove.

5. A combination according to claim 1 where the groove is further defined by a planar top wall which is parallel to the plane of the rim of the container.

6. The combination according to claim 1 wherein the lid is further provided with a radial groove which opens inwardly, and the periphery of the membrane is received in the radial groove so that the membrane is easily retained in the lid before the lid is applied to the container.

7. The combination comprising: a container having a side wall and a rim at the upper end of the side wall and surrounding an open top leading into the container, the rim being formed from a material which becomes plastic when heated to a prescribed temperature, the rim having a convex upwardly presented surface and a ridge projecting upwardly from the convex surface with the ridge being narrower than and extending in the direction of the rim and being continuous around the rim; a flexible seal membrane extended over the open top of the container as well as over the rim, the membrane including a metal foil which is at least located in the area overlying the rim of the container so that the membrane may be induction heated to the prescribed temperature in a rapidly oscillating magnetic field; and a lid including a cross portion overlying the membrane and the container rim and a skirt which extends downwardly along the rim so as to extend around the rim, the cross portion of the lid having a preformed downwardly opening groove which aligns with and overlies the container rim, the groove being capable of receiving a portion of the container rim when the membrane is deformed upwardly into the groove.

8. The combination according to claim 7 wherein the lid in its cross portion has opposed beveled surfaces which diverge downwardly and define the sides of the groove and a connecting top surface extended between the upper ends of the beveled surfaces, the beveled surfaces being positioned such that they locate generally along the sides of the convex upper surface when ridge is obliterated by heating the membrane and urging it downwardly by a force applied along the top surface of the groove.

9. The combination according to claim 8 wherein ridge is located intermediate the inner and outer margins of the convex upper surface on the rim so that a portion of the convex surface exists on the inside of the ridge and another portion exists to the outside of the ridge.

10. The combination according to claim 9 wherein the rim projects laterally from the portion of the container side wall located immediately below it and the skirt of the lid has a lip which projects inwardly and is positioned such that it is located immediately beneath the laterally projecting portion of the rim when the top surface of the groove is against the membrane and the ridge is obliterated.

11. The combination according to claim 13 wherein the ridge is between about 0.015 and 0.100 inch wide at the curved upper surface of the rim.

12. The combination according to claim 7 wherein the ridge is also curved in a generally convex configuration, but has a substantially smaller radius of curvature than the convex upwardly presented surface.

13. The combination according to claim 12 wherein the ridge projects upwardly from the curved upper surface between about 0.003 and 0.060 inch.

14. The combination according to claim 13 wherein the ridge at its base is between about 0.015 and 0.100 inch wide.

15. The combination comprising: a container having an upwardly presented opening and a rim surrounding the opening and being formed entirely from a nonmetallic material capable of becoming plastic when heated above a prescribed temperature, the rim having a convex upwardly presented surface; a flexible seal member extended over the open top of container as well as over the convex upwardly presented surface of the rim, the membrane including a metal foil which is at least located in the area of the membrane overlying the rim of the container so that the membrane may be induction heated to the prescribed temperature by subjecting it to a magnetic field which undergoes rapid reversals in polarity, the membrane being heat sealed to the rim as a result of being induction heated above the prescribed temperature and simultaneously forced against a ridge formed integral with and projected upwardly from the convex rim such that the ridge deforms into a generally obliterated condition along the convex rim and in so doing accommodates any irregularities between the contacting surfaces of the membrane and the rim; and a lid including a cross portion which overlies the membrane and the container rim and a downwardly projecting skirt at the periphery of the cross portion, the skirt being sized to fit snugly around the rim, the cross portion having a preformed groove which aligns with and is directly above the rim, with the groove being defined in part by continuous beveled side surfaces which downwardly diverge and are spaced sufficiently apart to enable the rim to be partially received in the groove when the lid is forced downwardly, the side surfaces of the groove being arranged to confine the membrane such that it generally follows the contour of the convex upper surface of the rim so as to be in contact with that surface for a substantial distance in the lateral direction.

* * * * *

UNITED STATES PATENT OFFICE
CERTIFICATE OF CORRECTION

Patent No. __4,044,941__  Dated __August 30, 1977__

Inventor(s) __David S. Knudsen__

It is certified that error appears in the above-identified patent and that said Letters Patent are hereby corrected as shown below:

Column 5, line 24, after "lid L" the phrase "and prevents the lid L" was omitted.

Column 6, line 10, the first "an" should be "and"

Column 9, line 4 (Claim 15), "member" should be "membrane"

Signed and Sealed this

Twenty-ninth Day of November 1977

[SEAL]

Attest:

RUTH C. MASON
Attesting Officer

LUTRELLE F. PARKER
Acting Commissioner of Patents and Trademarks